United States Patent [19]

Zaccaron

[11] Patent Number: 4,702,366

[45] Date of Patent: Oct. 27, 1987

[54] BUCKET CONVEYOR WITH A ROTATABLE BOOM

[76] Inventor: Luigi Zaccaron, Strada dei Colli, 2, 33030 Moruzzo (UD), Italy

[21] Appl. No.: 693,194

[22] Filed: Jan. 22, 1985

[30] Foreign Application Priority Data

Jan. 23, 1984 [IT] Italy .............................. 83308 A/84
Feb. 20, 1984 [IT] Italy .............................. 83321 A/84

[51] Int. Cl.[4] .............................................. B65G 17/36

[52] U.S. Cl. .................................... 198/509; 198/589; 198/519

[58] Field of Search ............... 198/509, 511, 519, 507, 198/301, 307, 856, 520, 587, 854, 307.1, 318, 317, 589, 816; 414/133

[56] References Cited

U.S. PATENT DOCUMENTS

| | | | |
|---|---|---|---|
| 1,100,897 | 6/1914 | Makowski | 198/519 |
| 1,460,172 | 6/1923 | Nelson | 198/519 |
| 3,921,793 | 11/1975 | Hutchinson | 198/816 X |
| 4,565,280 | 1/1986 | Zaccaron | 198/509 |

FOREIGN PATENT DOCUMENTS

| | | | |
|---|---|---|---|
| 425111 | 3/1922 | Fed. Rep. of Germany . | |
| 449844 | 9/1927 | Fed. Rep. of Germany | 198/509 |
| 1404529 | 6/1965 | France . | |
| 2518071 | 6/1983 | France . | |
| 2545068 | 11/1984 | France . | |
| 138802 | 5/1930 | Switzerland . | |
| 685301 | 12/1952 | United Kingdom . | |
| 795368 | 3/1954 | United Kingdom . | |
| 1292995 | 10/1972 | United Kingdom . | |
| 1394234 | 5/1975 | United Kingdom | 198/520 |

*Primary Examiner*—Joseph E. Valenza
*Assistant Examiner*—Jonathan D. Holmes
*Attorney, Agent, or Firm*—Wegner & Bretschneider

[57] ABSTRACT

Bucket conveyor (13) with a rotatable boom, which comprises a frame (18) and a plurality of pulleys (21-22-23) on which an endless catenary (17) of buckets (20) is driven, the catenary (17) consisting of at least one chain (19) bearing a plurality of buckets (20), in which bucket conveyor (13) substantially a whole lower bar (28) contained between the front lower pulley (22) and the rear lower pulley (23) is able to oscillate and is rotated about the neighborhood of the axis (30) of rotation of the front lower pulley (22). The variant of the bucket conveyor (13) with a rotatable boom comprises in cooperation with the front lower pulley (22) a support (41) able to move substantially in the plane on which such catenary (17) of buckets (20) lies.

13 Claims, 9 Drawing Figures

BUCKET CONVEYOR WITH A ROTATABLE BOOM

This invention concerns an articulated bucket conveyor; to be more exact, the invention concerns bucket-type loader of an orientable type, which comprises a special articulated structure.

Bucket loaders are known which take loose material from a heap of aggregate while they are oriented by means of the effect of a resilient, constant thrust and discharge such loose material at a desired place normally in a higher position.

Such loaders are mainly, but not only, employed in concrete mixing plant to produce concrete.

The present applicant produced earlier an evolutive solution which consists in having made capable of oscillating a part of the horizontal or almost horizontal segment that forms an extension or tail of the carrying frame. This solution enabled a smooth and constant tensioning of the catenary of buckets to be obtained.

Before such innovation, when the loader was working, the tensioning of the catenary became progressively reduced and compelled the employees involved to act once more to tension the catenary.

Before such innovation there was not only a great waste of time but the catenary and frame suffered during the step of tensioning the catenary.

Up to the time of such innovation the machine operator estimated the tensioning values and, when the catenary was slack, there was always the risk that it would leave its pulleys.

As a result of such innovatory improvement the natural elongation of the chain is now taken up by the lowering of the tail of the bucket loader.

Owing to such solution, even if the extension or tail is too high when the tensioning has been carried out, or is too low before the tensioning, no part of the machine is impaired and the machine operator can perform such maintenance work at longer intervals and more accurately.

Instead, the present invention arranges for the whole lower part of the frame to be made movable and able to oscillate. This invention enables bucket loaders to be constructed with a smooth and constant tensioning of the catenary even when the arm has a limited length.

The invention also enables the whole machine to be constructed with a smaller quantity of materials and with less processing. It also permits considerable simplification of the operations for storage, transport, assembly and maintenance.

In particular, any machine operator, whether skilled or not, can perform the assembly and maintenance work, this being a thing which was impossible beforehand.

Moreover, the invention makes possible a very wide range of adjustment of the tension of the bucket catenary since the inclusion of one single lower section permits the catenary to cooperate at all times with the transmission pulleys alone without any danger of coming into contact with portions of the frame.

Thus the invention enables the bucket loader to work on ground which is not perfectly at a right angle to the vertical centre line of the silo.

According to the invention the whole lower segment of the frame, that is, the segment which connects the two lower pulleys or pairs of lower pulleys is made capable of oscillating about the axis of rotation of the front lower pulley.

The invention can therefore be applied to bucket loaders with a one-chain catenary or with a two-chain catenary.

A variant of the invention makes use of such oscillatable tail to provide bucket loaders with a new capability which has not been envisaged earlier.

It is known that concrete mixing plants work with two or more aggregates of which one is normally positioned along one side of the bucket loader, whereas the other is normally positioned along the other side of the bucket loader.

A bucket loader which loads two or more types of aggregates and is moved by a device that gives it a required thrust in the required direction, turns to the right to load sand, for instance, and to the left to load gravel.

At the point, however, at which the buckets start their upward movement a deposit of aggregate begins to form and is a mixture of sand and gravel dropped during the turning movement, thus distorting the true weights of the sand and gravel.

Hitherto such possibility of a mistake has been eliminated by providing a specialized bucket loader for each type of aggregate.

The present invention tends to eliminate this drawback and to provide further advantages, which will become clear later in the description.

According to the invention, when the required quantity of aggregate has been reached and brought from the heap to the pre-selected place or unit, an elevation means lifts the front pulley of the almost horizontal segment momentarily.

This lifting action enables the catenary to disengage itself from the heap of aggregate which forms at the position where the buckets start ascending.

Such lifting action can be made to coincide with a halt of the catenary or with a momentary backward movement thereof.

Such combination of a temporary lifting of the central pulley together with a halt or momentary backward movement of the catenary has the effect that the dosage of materials is not distorted but is very accurate. Moreover, the action according to the invention makes it possible to obtain the same effect as that produced hitherto by two orientable bucket loaders acting on separate heaps of aggregate.

The invention is therefore embodied in a bucket conveyor with a rotatable boom, which comprises a frame and a plurality of pulleys on which an endless catenary of buckets is driven, the catenary consisting of at least one chain bearing a plurality of buckets, which bucket conveyor is characterized in that substantially a whole lower bar contained between the front lower pulley and the rear lower pulley is able to oscillate and is rotated about the neighbourhood of the axis of rotation of the front lower pulley.

A variant of the invention is embodied in an articulated bucket conveyor that comprises a frame and a plurality of pulleys, on which is driven an endless catenary of buckets consisting of at least one chain bearing a plurality of buckets, which bucket conveyor is characterized in that a support able to move substantially in the plane on which such catenary of buckets lies, is comprised in cooperation with the front lower pulley.

Let us now see an example of the invention, which is nonrestrictive, with the help of the attached figures, in which:

FIG. 1 gives a side view of a traditional application of a bucket loader;

Reference is made in the figures to a loader with a two-chain catenray, but the invention can also be transferred directly to a loader with a catenary consisting of one chain.

Figure 1:
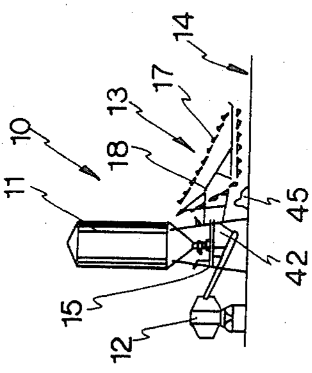
Figure 2:
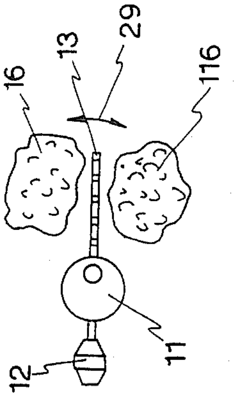
FIG. 2 shows the example of FIG. 1 from above.

FIGS. 1 and 2 show a concrete mixing plant 10 consisting of a silo 11, concrete mixer 12, dosing unit 42 and bucket loader 13. The bucket loader 13 comprises a frame 18 with an axis of orientation 27 and a catenary 17 of buckets 20.

The plant 10 is installed on ground 14 over which a substantially horizontal segment 117 of the catenary 17 runs.

As work proceeds, a frontal deposit 45 of aggregate builds up at the front part of the loader 13; such deposit 45 consists of the aggregate which falls from the buckets 20 because it is in excess or because of the swinging of the buckets 20, and which falls onto a chute 44 and is transferred thereby to a position where it is not contacted.

As we said earlier, the bucket loader 13 can be oriented about the axis 27 by means of a substantially constant thrust provided by means which are known and are therefore not shown here. Such orientation takes place towards the right or left according to the arrows 29.

If the loader 13 turns to one side, it withdraws aggregate from a heap 16, whereas if it turns to the other side, it takes aggregate from a heap 116.

Such type of loader 13 and its method of working have been studied and embodied by the present applicant and are well known in the art.

Figure 3:
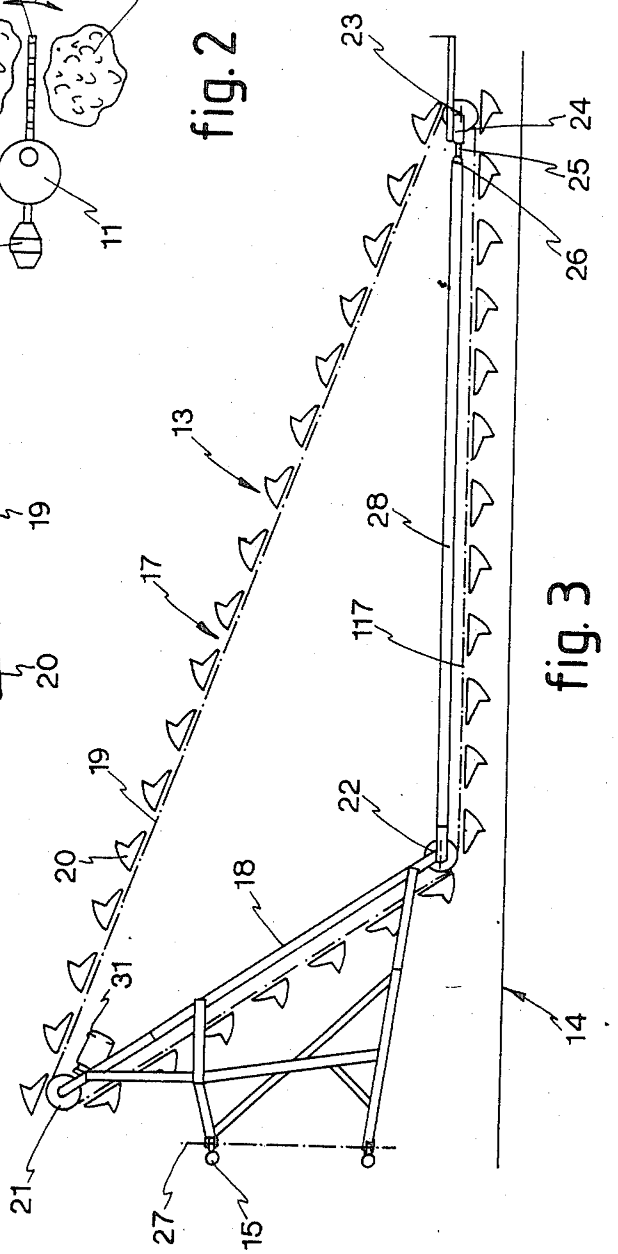
FIG. 3 shows an application of the invention.
Figure 4:
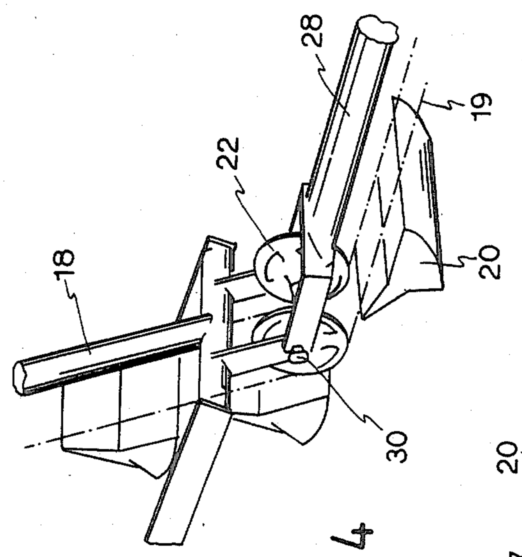
FIG. 4 shows a detail of a part of embodiment of FIG. 3.

According to the invention the whole lower part of the frame 18, namely the lower bar 28, is pivoted on the same axis 30 as a front lower pulley 22 or in the neighbourhood of such axis 30 in the preferred embodiment shown in FIG. 3.

To assemble the bucket loader, the person employed for this purpose has only to insert a pin which acts as an axle 30, and the whole frame 18–28 is assembled.

The catenary of buckets 17 is fitted next, so that it is positioned on a plurality of pulleys 21–22–23, of which the pulley 21 is normally powered and is driven by a motor 31.

To tension the chain requires no particular care on the part of the machine operator, who only has to act on a threaded tensioner coupling 25 and then to clamp it with a clamp means 26.

By means of this operation the lower bar 28 is raised slightly and thereafter gradually takes up its normal position during a long working period as a result of the natural elongation of the chain 19.

Within this range of variation the whole catenary 17 remains at a constant tension owing to the force of the weight of the lower bar 28 acting on the rear lower pulley 23.

Weights to govern the tensioning can be provided on the lower bar 28 or in cooperation therewith.

According to the invention the tensioner coupling 25 can be located near the pulley 23 or at any position along the lower bar 28 and can be a two-threaded coupling or be a jack or be operated by a cam or be of another type.

The above description shows clearly how easy it is to produce, store, transport, assemble or adjust the bucket conveyor.

Moreover, the maintenance problems are considerably reduced, the precision of construction of the various elements forming the lower part of the frame having been made less evident.

Figures 5, 7:
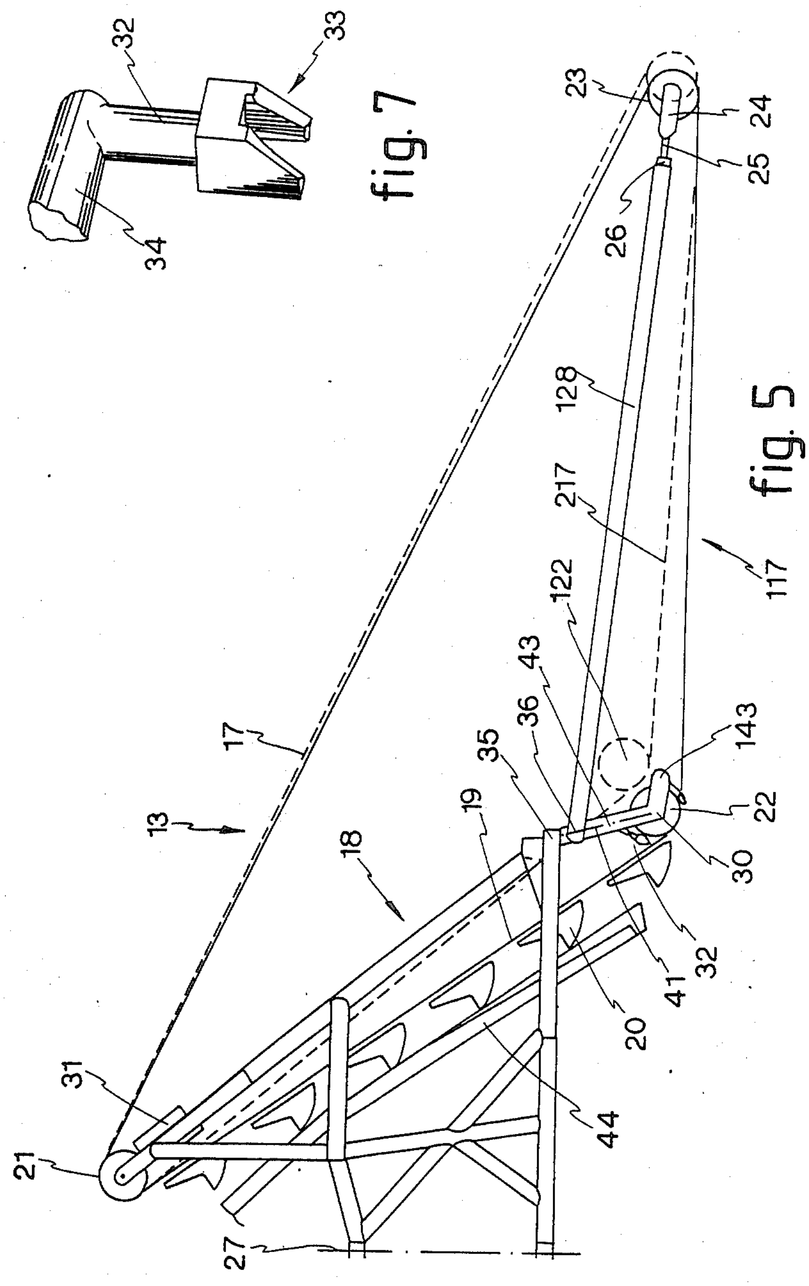
FIG. 5 shows a variant of the invention.
FIG. 7 shows a resistance tooth or catch.

Let us now see how a specific case is shown as an example in FIG. 5. The solution of the variant shown in FIG. 5 provides a mechanical embodiment of the invention actuated by the direction of feed of the catenary.

We have preferred to show this embodiment since it is the most complex one, but the engagement or disengagement action can be caused also by a jack, winch or any other unit suitable for obtaining the action of temporary lifting of the front pulley.

In the operations of weighing by precision dosage, the presence of the frontal deposit 45 creates shortcomings and uncertainty regarding the accuracy of dosage of the components.

As we said earlier, this invention tends to overcome such shortcomings and to broaden the field of application of bucket loaders.

Figure 8:
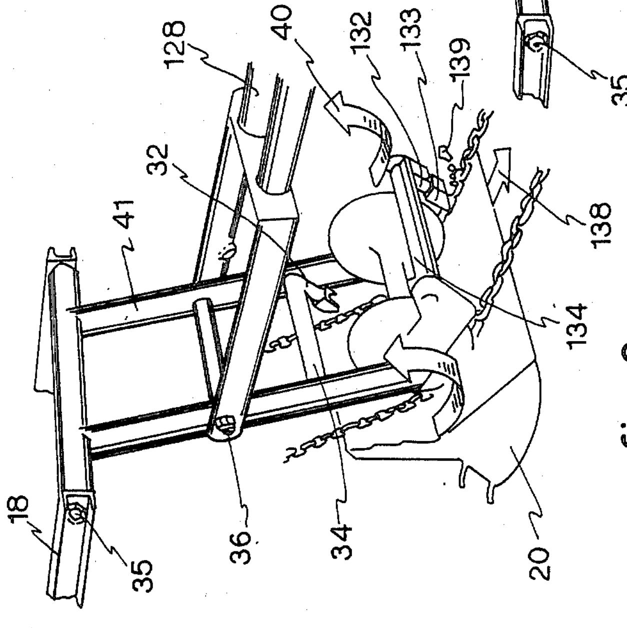
FIG. 8 shows the embodiment of FIG. 5 during the lifting step.

Let us suppose that the loader is applied to the heap of aggregate 16 and that a weighing unit 42 shows that the required weight of such aggregate has been reached. The electrical inverter of the motor 31 which drives the catenary 17 is then tripped and makes the catenary move in the reversed direction 138 (FIG. 8).

When the chain 19 is reversed, a catch or resistance tooth 132 with a prong 133 anchors itself to the chain 19 by swinging on the axis 143. The catch 132 is anchored so as to be able to swing on an oscillatable support or fork 41, which supports the pulley or pulleys 22.

Owing to the action of the catch 132, which swings in the direction 139 together with the chain 19, the oscillatable fork 41 moves in the direction 40 (FIG. 8), being pivoted at 35. Such movement of the oscillatable fork 41 brings the front lower pulley 22 upwards (FIGS. 5 and 8) in relation to its working position. Through such upward movement the buckets 20 are taken out of the area of contact with the deposit 45, which has formed at the position where such buckets 20 start their upward travel.

Such lifting action is made possible by the articulated structure comprising the oscillatable fork 41 and lower bar 128, which is anchored so as to be able to swing on such oscillatable fork 41.

In fact, the catenary 17 running on the pulleys 21–2-2–23 is deformed by the action of the fork 41 on the lower bar 128 (FIG. 5) and assumes a triangular form without losing its tension.

The tensioning is obtained by acting on the tensioner coupling 25, which presses against a fork 24 that bears the pulley 23, and by clamping at the required tension by means of the clamp 26.

The oscillatable fork 41 is anchored so as to be able to oscillate at 35 on the frame 18.

A mechanical safety end-of-run stop 37 is provided advantageously so as to avoid damage in the event of abrupt action.

When the pulley 22 has reached its required raised position, the catch 132 is disengaged from the chain 19 and permits the catenary 17 of buckets to move backwards to perform any suitable requirements.

The loader 13 is now detached from the heap 16 and is brought near the heap 116; the movement of the catenary of buckets 17 is then inverted once more and thus is in the direction of loading 38 of such catenary 17.

Figure 9:
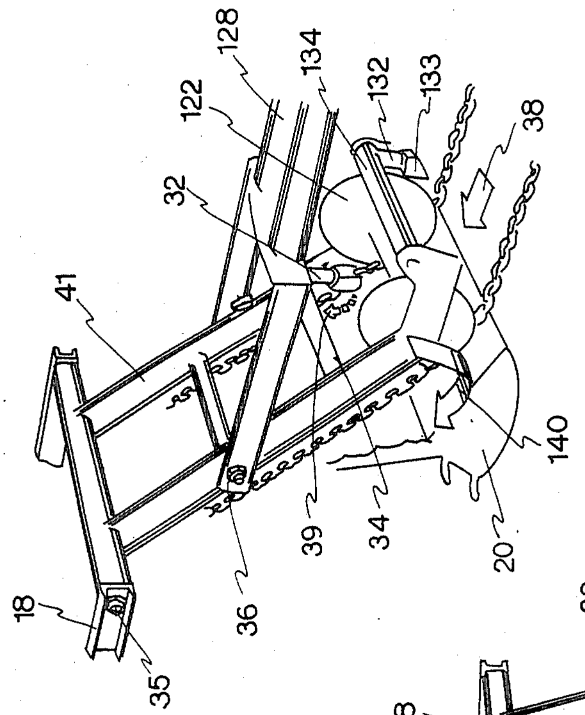
FIG. 9 shows the embodiment of FIG. 5 during the lowering step.
Figure 6:
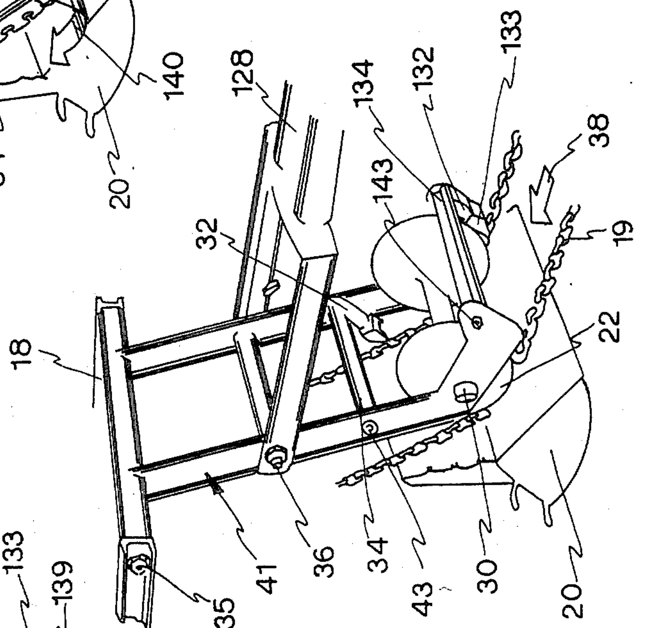
FIG. 6 shows the embodiment of FIG. 5 during the loading stop.

This movement brings into action a catch 32, which clamps the chain 19 and brings the pulley 22 from 122 to the loading position (FIGS. 9 and 6).

As in the case of FIG. 8, owing to the position of the pivot 43 the catch 32, which has moved according to 39, becomes disengaged after a short length of travel of the chain 19, which thus becomes free to run once again.

In the meantime the pulley 22 has reached bottom dead centre in its loading position.

The movement of the pulley 22 to its higher position 122 with a resulting lifting of the bucket catenary 17 (FIG. 5) from 117 to 217 and the return of the catenary 17 to its working position are actuated, in the example shown, by inversion of the motion (from 38 to 138 and then back to 38 again) of the catenary 17 bearing the buckets 20 and by means of the action of the catches 32–132.

However, as we said earlier, the movement of the pulley 22 can be actuated also by jacks, turnbuckle couplings, winches or springs caused to act on the fork 41 or on the support of such pulley 22 or on the lower bar 128.

The variant of the invention provides not only the advantages detailed above but also the same quality of dosage as can be obtained with several loaders of aggregate each of which is specially produced to handle only one type of aggregate.

INDEX

10—concrete mixing plant
11—silo
12—concrete mixer
13—bucket loader
14—ground level
15—support of loader
16—heap of aggregate
116—heap of aggregate
17—catenary of buckets
117—segment of catenary at ground level
217—lifted catenary
18—frame
19—chain
20—buckets
21—upper pulleys
22—front lower pulleys
122—upper position of pulleys
23—rear pulleys
24—fork
25—tensioner coupling
26—clamp
27—axis of orientation
28—lower bar - extension
128—lower bar
29—direction of orientation
30—axis or shaft of pulley
31—motor
32—catch or resistance tooth
132—catch or resistance tooth
33—prong
133—prong
34—connecting rod
134—connecting rod
35—pivot
36—axis of oscillation of extension
37—end-of-run stop
38—direction of loading
138—reverse direction
39—direction of engagement of catch
139—direction of engagement of catch
40—direction of movement of fork
140—direction of movement of fork
41—oscillatable support or fork
42—dosing unit
43—axis of swinging of catch
143—axis of swinging of catch
44—chute
45—frontal deposit.

I claim:

1. A bucket conveyor comprising:

a boom rotatable in a horizontal plane, comprising:

- a generally vertical front frame member comprising a lower section which is rotatable in a vertical plane;
- a lower bar having first and second ends, the first end being pivotably secured to the lower section of said frame member, said bar being rotatable in a vertical plane;
- a front lower pulley located in the vicinity of the first end of the lower bar; and
- a rear lower pulley in the vicinity of the second end of the bar;

an endless catenary of buckets comprising a plurality of buckets carried on at least one chain; and means for tensioning said catenary;

- said front and rear lower pulleys defining a tensioned, generally horizontal run for said catenary, said buckets being carried on the horizontal run in loaded condition from said rear lower pulley to said front lower pulley above the surface on which the conveyor rests;
- tension being maintained as said catenary lengthens during use through downward rotation of said lower bar, the tension in said catenary holding said lower bar in a generally horizontal position.

2. The bucket conveyor of claim 1, wherein said lower bar includes said rear lower pulley.

3. The bucket conveyor of claim 2, wherein said lower bar includes a means to govern the tensioning of said catenary.

4. The bucket conveyor of claim 1, wherein said lower bar includes a means to govern the tensioning of said catenary.

5. The bucket conveyor of claim 4, wherein said means to govern tensioning is a threaded coupling.

6. The bucket conveyor of claim 1, wherein said lower bar can be dismantled by simple removal of the shaft of said front lower pulley.

7. The bucket conveyor of claim 1, further comprising means to move said lower section through cooperation with said lower section.

8. The bucket conveyor of claim 7, wherein the means to move said lower section comprise first and second catches secured to said lower section, capable of engaging said chain, said first catch being engaged by said chain upon commencement of reverse movement of the chain, said second catch being engaged by said chain upon commencement of forward movement of the chain following reverse movement.

9. The bucket conveyor of claim 8, wherein the first and second catches are located on opposite sides of said front lower pulley with respect to the direction of chain travel.

10. The bucket conveyor of claim 1, further comprising means to move said lower section through cooperation with said lower bar.

11. The bucket conveyor of claim 10, wherein said means o move said lower section comprises jacks.

12. The bucket conveyor of claim 10, wherein said means to move said lower section comprises winches.

13. The bucket conveyor of claim 10, wherein said means to move said lower section comprises screw shackles.

* * * * *